Sept. 8, 1925.
A. L. RUTQUIST
RAFTER MITER
Filed Oct. 27, 1924
1,553,187
2 Sheets-Sheet 1
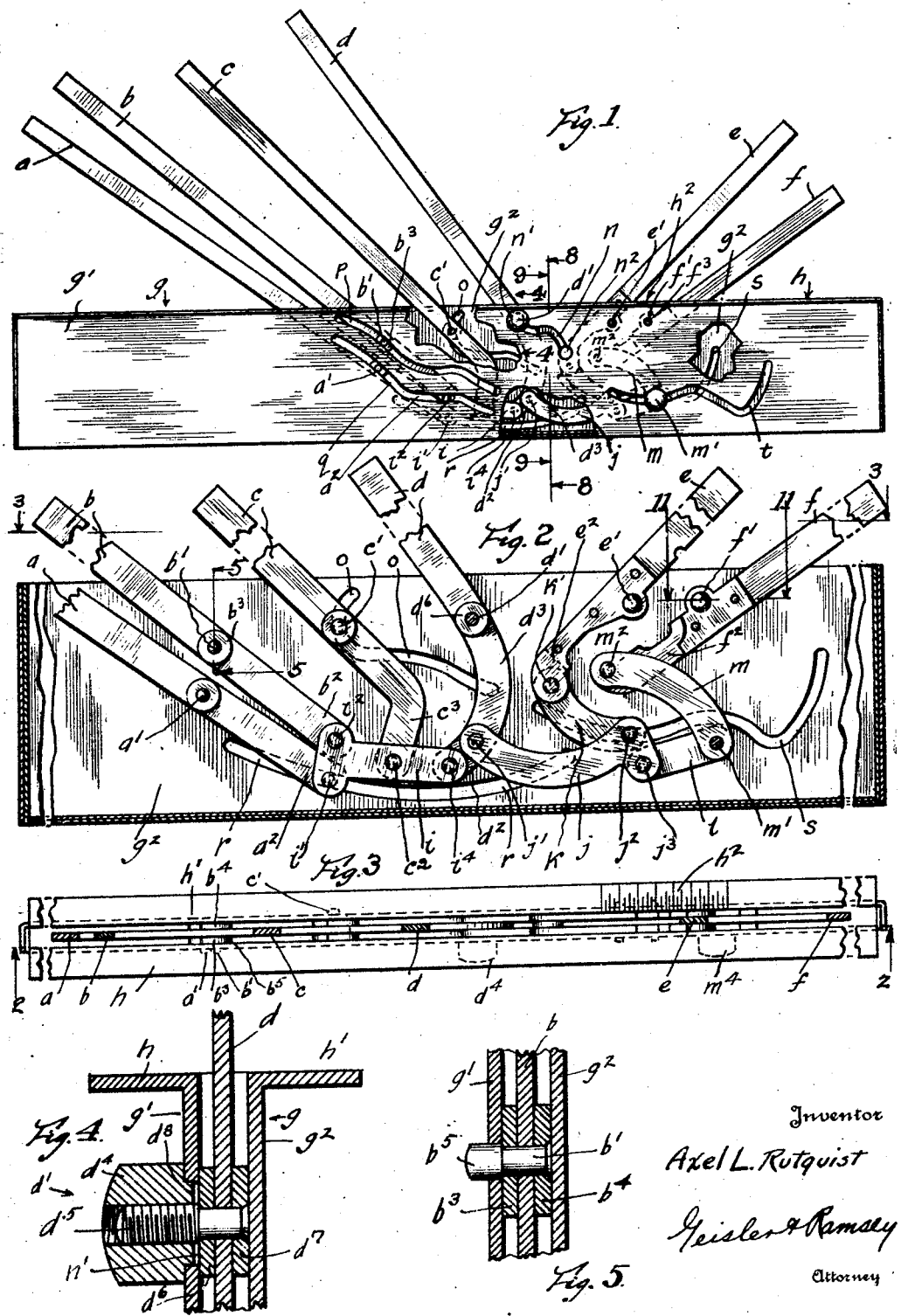
Inventor
Axel L. Rutquist
Geisler & Ramsey
Attorney Sept. 8, 1925.	1,553,187
A. L. RUTQUIST
RAFTER MITER
Filed Oct. 27, 1924   2 Sheets-Sheet 2
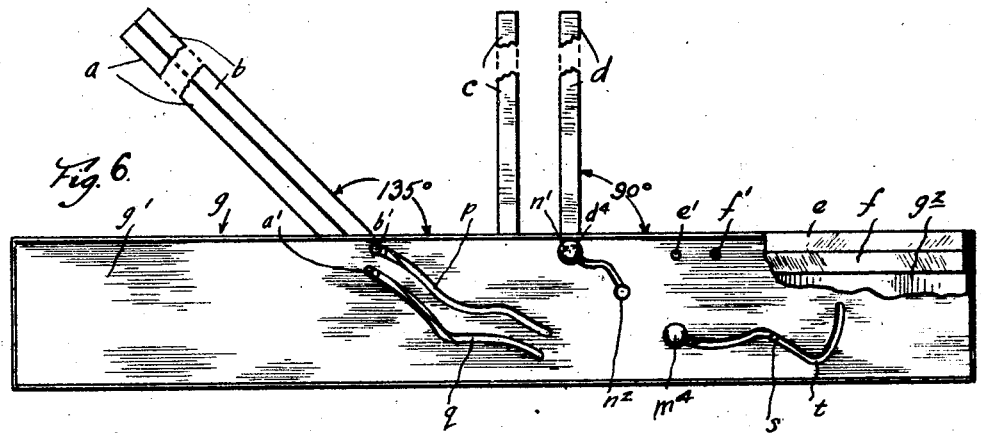
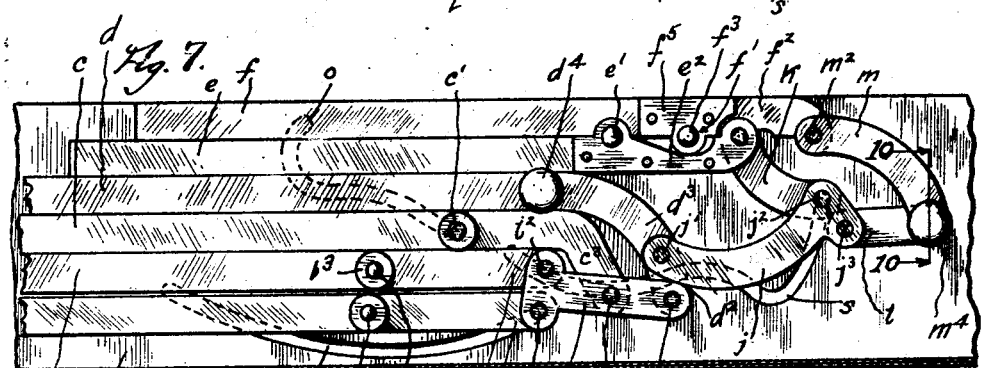
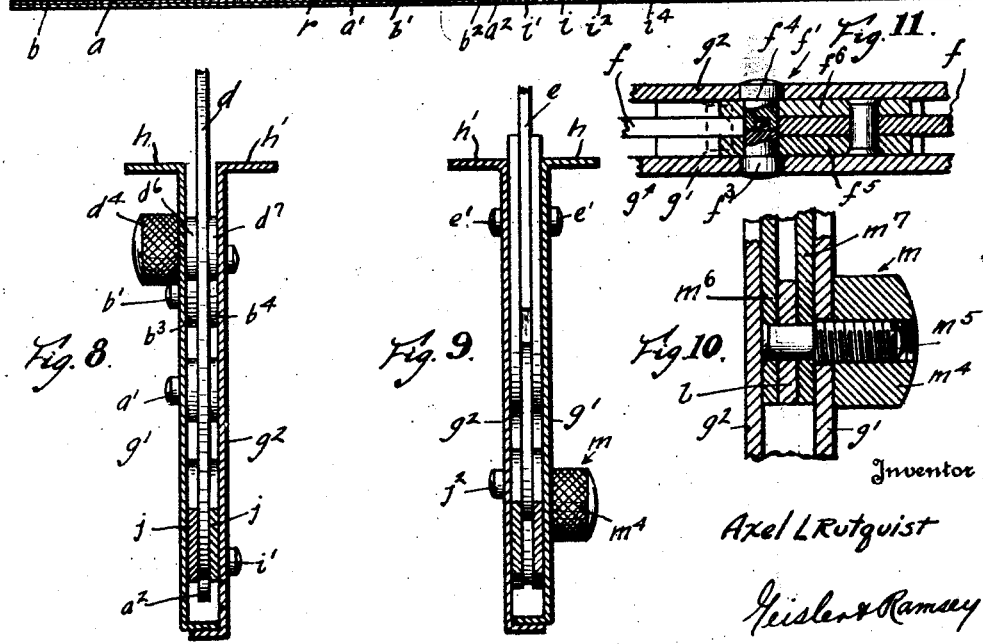
Inventor
Axel L Rutquist
Geisler & Ramsey
Attorney Patented Sept. 8, 1925.

1,553,187

UNITED STATES PATENT OFFICE.

AXEL L. RUTQUIST, OF PORTLAND, OREGON.

RAFTER MITER.

Application filed October 27, 1924. Serial No. 746,053.

*To all whom it may concern:*

Be it known that I, AXEL L. RUTQUIST, a citizen of the United States, and a resident of Portland, county of Multnomah, and State of Oregon, have invented a new and useful Improvement in Rafter Miters, of which the following is a specification.

A further object of my invention is to provide an improvement over the rafter miter which was patented by myself August 14, 1917, which received Patent No. 1,236,486. The improvements of my present invention over the rafter miter described in said former invention, permit a more accurate adjustment of said parts, which adjustment can be made more quickly and the connections are less liable to be injured inadvertently by rough usage, because said connections are contained within the metallic casing into which said angularly adjustable parts fold.

A further improvement consists in arranging said parts so that additional members can be provided to automatically determine the cuts upon some rafters which are impossible to obtain with my former device.

A further object is to provide a device which requires no middle partitioning plate such as shown and described in my former application inasmuch as the guiding grooves for said members are cut in the sides of said container and extend therethrough, said side portions being separable to permit the assembly of the parts.

A further and more specific object is to provide setting means adapted to constitute a fixed point for said members, which cannot be varied, because a slight variation throws the angular arrangement of the members out of correct relationship with each other.

I attain my objects in a tool which I have termed a rafter-miter in which the members are pivoted at points located a substantial distance from their inner ends and I connect said inner ends by members so arranged that the adjustment of one of said members will correspondingly arrange the remaining members. The connections are made at the inner ends instead of the free ends, thus are enclosed by said container, as before mentioned, at all times so that the connections cannot become inadvertently injured by rough usage.

The details of construction and mode of operation are hereinafter more fully described with reference to the accompanying drawings, in said drawings:

Fig. 1 is a side elevation of my rafter miter with a portion of one side of the stock, which serves as a casing, shown as broken away to disclose the grooves which are cut through the opposite side of said casing;

Fig. 2 is a longitudinal section through the casing taken substantially along the line 2—2 of Fig. 3;

Fig. 3 is a plan section taken substantially along the line 3—3 of Fig. 2;

Fig. 4 is a fragmentary section taken substantially along the line 4—4 of Fig. 1 except that it is on a much greater scale, said section showing the main pivot;

Fig. 5 is a fragmentary section taken substantially along the line 5—5 of Fig. 2, and shows one of the pivots by which the connections are made;

Fig. 6 is an elevation similar to Fig. 1 except that the members have been adjusted so that two of the members are moved so as to be enclosed within a metallic casing;

Fig. 7 is a fragmentary longitudinal section taken substantially along the line 2—2 of Fig. 3 except that the members have been folded within the casing;

Fig. 8 is an enlarged fragmentary section taken on the line 8—8 of Fig. 1;

Fig. 9 is a similar scaled fragmentary section taken along the line 9—9 of Fig. 1;

Fig. 10 is a larger scaled fragmentary section taken along the line 10—10 of Fig. 7;

Fig. 11 is a section taken on the line 11—11 of Fig. 2.

My rafter miter consists of a number of adjustable members $a, b, d, c, e$ and $f$ which are pivotally connected to stock $g$, which also serves as a casing for said members. Said casing is composed of two separable side members $g'$ and $g^2$ spaced apart and the pivots of each of said members pass through one or both of said sides and some are adjustable along grooves cut therein. The arm $a$ is arranged to indicate the angle of cut, relatively, to a horizontal plane, that should be made in the side of a jack rafter or the side of a cripple rafter. Member $b$ indicates the cut in a similar manner which should be made on a side of a hip or valley rafter. Member $c$ indicates in a similar manner the plumb cut of a common rafter or a jack rafter. Member $d$ indicates the plumb cut of a hip or valley rafter and also indicates the cut of the sheeting which is nailed to said rafters. The adjustments of said rafter miter are all made preferably with reference to the member $c$. The angle that this member makes relatively to the upper surface of the metallic container $g$ corresponds to the desired pitch of the roof to be laid out. The angle that the member $d$ makes indicates the correct angle for the plumb cut of the hip or valley rafters. The angle to which the member $e$ is adjusted determines the angle at which the seat on the plate of the common rafters, jack rafters or cripple rafters should be made. This member also will indicate the angle of cut upon the sheeting which joins at the hip or valley rafters, graduations $h^2$ being marked on either of the flanges $h$ or $h'$ of the metallic container $g$, the cut being made at the angle indicated by the member $d$ when a set is made by said arm $e$ upon said graduated scale. The angle that member $f$ makes with the edge of the metallic casing $g$ indicates the angle which the seat on the plate of the hip or valley rafters should make with the horizontal. Said member $a$ is virtually a straight flat bar pivoted on a non-adjustable pin $a'$ and the inner end $a^2$ of which is connected to the inner end $b^2$ of the member $b$ by T-shaped connecting member $i$. The member $b$ is also a straight bar and is pivotally attached to the stock casing $g$ by a non-adjustable pin $b'$. The member $c$ has an offset portion $c^3$ below its pivot $c'$ and thus the inner end $c^2$ makes an angle with the remainder of said member. Said inner end is also connected with said T-shaped connecting member $i$. The member $d$ is pivoted about an adjustable screw $d'$ and the portion $d^3$ of said member below said pivot is curved so that the inner end $d^2$ is out of alinement with the remaining portion of said member $d$. The inner end $d^2$ of said member is also pivotally connected to said T-shaped connecting member $i$. The connection by which the inner end $a^2$ is connected to said member $i$ is by means of a pivot connection $i'$. The connection between the inner end $b^2$ and said member $i$ is made through the pivot connection $i^2$. The connection between the inner end $c^2$ and the member $i$ is the pivot $i^3$ and the connection between the inner end $d^2$ and the member $i$ is a pivot $i^4$. Said inner end $d^2$ of said member $d$ is also pivotally connected to a curved member $j$ through a pivot connection $j'$. Said member $j$ is also connected to the member $e$ through a curved link $k$ which is fastened to the inner end $e^2$ by means of a pin $k'$. Said member $e$ is virtually a straight member pivoted on its non-adjustable pivot $e'$. The connection between said member $j$ and said link $k$ is made through a pivot connection $j^2$. Said connection $j$ is also connected to a link $l$ through a pivot connection $j^3$, said link $l$ being pivotally connected to a link $m$ through an adjustable pivot connection $m'$, said curved connecting link $m$ being fastened at its other end to the inner end $f^2$ of the member $f$ through the non-adjustable pivot connection $m^2$. Said member $f$ is substantially a straight member which is pivoted upon a pivot member $f'$. The only pivot connection for said members which are not adjustable relatively to said metallic casing in a slot are the pivot connections $e'$ and $f'$ as shown in Fig. 1. The pivot connection $d'$ is movable relatively in the slot $n$ cut in the side $g'$ of the metallic casing. Said pivot connection $c'$ is movable relatively in the slot $o$ cut in the side $g^2$ of the metallic casing. The pivoted connection $b'$ is adjustable relatively in the slot $p$ cut in the side $g'$ of the metallic casing and the pivot $a'$ is adjustable relatively in the slot $q$ cut in the side $q'$ of the casing. The pivot $i'$ is adjustable relatively in the slot $r$ cut in the side $g^2$ of the metallic casing. The pivot connection $j^2$ is adjustable relatively to the slot $s$ cut in the side $g^2$ of the casing and the adjustable member $m'$ is adjustable relatively in the slot cut in the side $g'$ of the casing. As shown in Fig. 4 the pivot connection $d'$ is made adjustable by being provided with a nut $d^4$ threaded on a stud $d^5$ fastened to two spacers $d^6$ and $d^7$ to each side of the member $d$. Said nut $d^4$ is made with a portion $d^8$ which is slightly smaller in diameter than the remaining portion of said nut and which is exactly the same diameter as the circular apertures $n'$ and $n^2$ that terminate each end of the groove $n$ and the diameter of said stud $d^5$ is exactly the same as the width of the slot $n$. The portion of said nut above said narrowest portion $d^8$ thus forms a shoulder which is adapted to bear against said member $g'$.

In Fig. 5 I show a detailed view of a typical pivoted connection for the remainder of said member. This connection $b'$ is a rivet which holds two spacers $b^3$ and $b^4$ at each side of the member $b$. The head $b^5$ of said stud like member is substantially the same diameter as the width of said slot $p$ so that the sides of said slot will form a guide way for the movement of said stud therein.

In Fig. 11 the portions $f^3$ and $f^4$ of said pivot connection $f'$ shown in detail are threaded together and hold the spacers $f^5$ and $f^6$ to said member $f$ and the heads of each member pass through the side members $g^2$ and $g^1$ respectively. In Fig. 10 the portions of the adjustable pivoted connection $m'$ receive the same numerical suffix as do the similar parts in Fig. 4 thus said parts are numbered respectively $m$, $m'$, $m^4$, $m^5$, $m^6$ and $m^7$. In this pivotal connection the nut $m^4$ does not have a narrowed portion but said nut $m$ is adapted to engage the side $g'$ of the stock to hold the members in set position. The threaded portion $m^5$, however, is substantially the same diameter as the width of said slot.

My instrument is so constructed that the angularly adjustable members $a$ to $f$, inclusive, may be entirely concealed within the metallic container $g$ as shown in Fig. 7 and thus the parts cannot be injured when said instrument is being carried about. The grooves $n$, $o$, $p$, $q$, $r$, $s$, and $t$ are co-related so as to permit said members to be so adjusted and are also arranged so that by lifting the uppermost member which is $f$ said connections will withdraw the remaining adjustable member out successively. The curves for said slots or guide ways are plotted so that said members not only will fold within said container but will assume the correct relative angle with the remaining members in all positions from horizontal to a pitch which makes an angle of 60° with a horizontal plane. As before set forth, the member $d$ might be termed the master lever as it is the lever which is most commonly used to determine the set because it indicates directly the pitch of the roof which is being constructed. It is to be understood that said device will determine all angular cuts for the rafters, only when the pitches for the various portions of said roof are the same. If the pitch in the various portions of roof varies it will be necessary for the operator using my instrument to change the setting master lever $d$ to conform to the given pitch. In Fig. 6 I show how the master lever $d$ can be set for 90°, and illustrates how the members $e$ and $f$ will disappear below the flanges $h$ and $h'$ when the parts are set to this degree and in Fig. 1 I show how the master lever can be set for a roof having an ordinary pitch and the remaining members will assume their correct position relatively thereto. The members $a$ to $f$ are held in position within the container $g$ by tightening the nut $d^5$ in the aperture $n'$ which terminates the slot $n$ at its inner end. As heretofore described the shoulder $d^5$ on said nut exactly fits said aperture and thus when said nut is tightened the members can not move from place. To permit the members to be drawn from the container said nut $d^4$ is slacked off on the threaded pin $d^5$ and the master lever is drawn outwardly from said container so that the pivot reaches the upper end of said slot $n$ bringing with it all of the other members $a$, $b$, $c$, $e$ and $f$ respectively outwardly in their slots. When the members are in this position they assume their correct relative position to said master lever. The nut $d^4$ is then tightened so that the shoulder $d^8$ fits closely within the circular aperture $n^2$ which terminates the slot $n$ at its outer end. Said shoulder $d^8$ fits closely within said circular aperture $n^2$ and thus forms an exact pivot about which said members can be adjusted. When said master lever $d$ has been adjusted to the desired position it is set in that position by tightening the nut $m^4$ of the pin $m^5$. To place said adjustable members in the container the nut $m^4$ is slacked off, the nut $d^5$ is also slacked off to such an extent that the shoulder $d^8$ is removed from co-operative relationship with the aperture $n^2$, and the master lever is adjusted so that the pivot $n$ slides to the lower end of said guide way bringing with it, in their respective ways, the remaining levers. In this position all of the members can be folded so that they fall in parallel relationship with each other and are completely housed within the container.

I claim:

1. In an instrument of the character described, a stock member provided with a plurality of curvilinear co-related slots or guideways, a corresponding number of adjustable members each having one end, respectively, pivotally mounted in one of said slots or guideways said stock member constituting a container for enclosing the pivoted end of said members and connecting members pivotally attached to each of the pivoted ends of said adjustable members.

2. In an instrument of the character described, a stock member provided with a plurality of curvilinear co-related slots or guideways, a corresponding number of adjustable members each having one end pivotally mounted in one of said slots or guideways, respectively, said pivots being located a substantial distance removed from the latter end and connecting members pivotally attached to each of the pivoted ends of said adjustable members.

3. In an instrument of the character described, a stock member provided with a plurality of curvilinear co-related slots or guideways and a corresponding number of adjustable members each having one end pivotally mounted in one of said slots or guideways, respectively, said pivots being located a substantial distance removed from the latter end and connecting members pivotally attached to each of the pivoted ends of said adjustable members, said connections being concealed within said stock member.

4. In an instrument of the character described a stock member composed of two separable halves and having a plurality of curvilinear slots or guideways in each half, a corresponding number of adjustable members each having one end pivotally mounted in one of said slots or guideways, respectively, and connecting members pivotally attached to each of the pivoted ends of said adjustable members.

5. In an instrument of the character described a stock member provided with a plurality of curvilinear co-related slots or guideways, a corresponding number of adjustable members each having one end pivotally mounted in one of said slots or guideways, respectively, and connecting members pivotally attached to each of the pivoted ends of said adjustable members, one of said members being pivotally connected to said stock member through a slot or guideway which opens into an aperture of larger diameter than the width of said slot or guideway, means on said member adapted to engage said aperture to hold said member in one position in said slot.

6. In an instrument of the character described, a stock member provided with a plurality of curvilinear co-related slots or guideways, a corresponding number of adjustable members each having one end pivotally mounted in one of said slots or guideways, respectively, and connecting members pivotally attached to each of the pivoted ends of said adjustable members, one of said members being pivotally connected to said stock member through a slot or guideway which opens into an aperture of larger diameter than the width of said slot or guideway, a nut having a shoulder portion smaller than the remaining portion of said nut on said member adapted to engage said aperture to hold said member in one position in said slot.

7. In an instrument of the character described, a stock member provided with a plurality of curvilinear co-related slots or guideways, a corresponding number of adjustable members each having one end pivotally mounted in one of said slots or guideways, respectively, a flange on one edge of said stock member having a graduated scale thereon, one of said members being pivoted to register on said scale.

8. In an instrument of the character described, a stock member provided with a plurality of curvilinear co-related slots or guideways, a corresponding number of adjustable members each having one end pivotally mounted in one of said slots or guideways, respectively, and connecting members pivotally attached to each of the pivoted ends of said adjustable members, a flange on one edge of said stock member having a graduated scale thereon, one of said members being pivoted to register on said scale.

9. In an instrument of the character described, a stock member provided with a plurality of curvilinear co-related slots or guideways, a corresponding number of adjustable members each having one end pivotally mounted in one of said slots or guideways, respectively, one of said members being pivotally connected to said stock member through a slot or guideway which opens into an aperture of larger diameter than the width of said slot or guideway means on said member adapted to engage said aperture to hold said member in one position in said slot.

AXEL L. RUTQUIST.